(12) United States Patent
McAlpine et al.

(10) Patent No.: US 6,188,821 B1
(45) Date of Patent: Feb. 13, 2001

(54) APPARATUSES AND METHODS FOR USE IN THE MAKING OF A SELF-SUPPORTING FIBER OPTIC CABLE

(75) Inventors: Warren W. McAlpine, Hickory; Mark A. Sigmon, Newton, both of NC (US)

(73) Assignee: Siecor Operations, LLC, Hickory, NC (US)

(*) Notice: Under 35 U.S.C. 154(b), the term of this patent shall be extended for 0 days.

(21) Appl. No.: 09/102,392

(22) Filed: Jun. 22, 1998

(51) Int. Cl.7 ............................................. G02B 6/44
(52) U.S. Cl. ................................................. 385/100
(58) Field of Search ................................. 385/100, 101, 385/102, 103, 106, 107, 109, 113, 147

(56) References Cited

U.S. PATENT DOCUMENTS

| 4,662,712 | * | 5/1987 | Tabata et al. ............... 350/96.23 |
| 4,883,671 | * | 11/1989 | Onodera et al. ............... 425/122 |
| 5,678,609 | * | 10/1997 | Washburn ................... 138/107 |

FOREIGN PATENT DOCUMENTS

| 2169094B | * | of 1988 | (GB) | ............... G02B/6/44 |
| 46-38748 | * | 11/1971 | (JP) . | |
| 8-75969 | * | 9/1994 | (JP) . | |
| 9-54232 | * | 8/1995 | (JP) | ............... G02B/6/44 |
| 8-136778 | * | 5/1996 | (JP) | ............... G02B/6/44 |

* cited by examiner

*Primary Examiner*—Akm E. Ullah
(74) *Attorney, Agent, or Firm*—Timothy J. Aberle

(57) ABSTRACT

Apparatus and method for making a self-supporting type fiber optic cable (10) having a messenger section (12) and a core section (14) connected by a web (18). An exemplary apparatus (20) includes a cable core tensioning apparatus (30), a messenger wire tensioning apparatus (40), and a cable tensioning apparatus (60). The cable tensioning apparatus (60) includes a messenger tensioner (61) having a profile with a tensioning recess (62) and a clearance recess (64). The tensioning recess (62) being operative to grip and to thereby apply tension to the messenger section (12), and the clearance recess (64) essentially frictionlessly accommodating the formation of undulations in the core section (14). In an exemplary method the undulations are formed in the core section as the cable progresses through tensioning apparatus (60) by maintaining an essentially decoupled relationship between the core section (14) and the clearance section (64) of the tensioning apparatus (60). Tensioning apparatus (60) can include at least one knife for forming windows in cable (10).

16 Claims, 5 Drawing Sheets

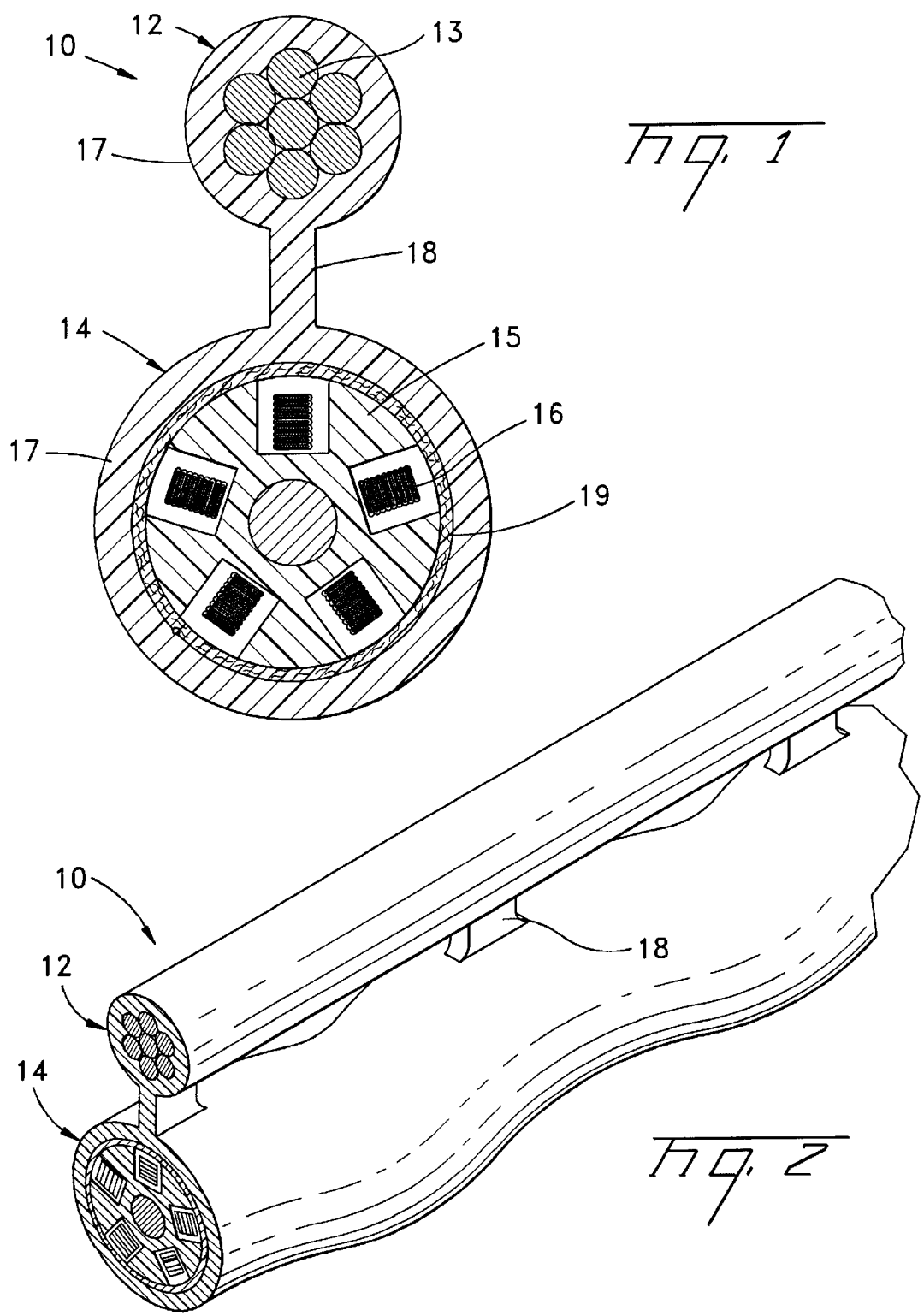

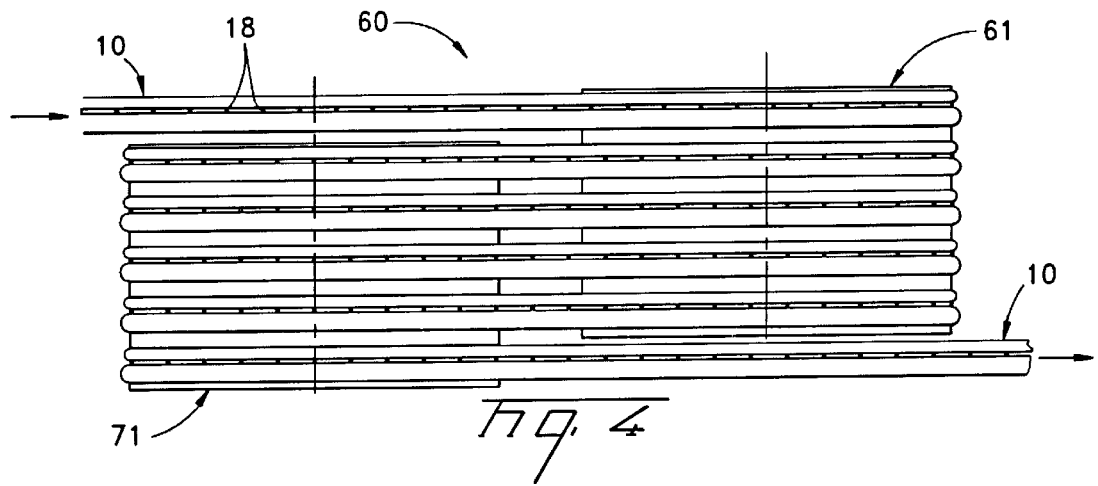
Fig. 4
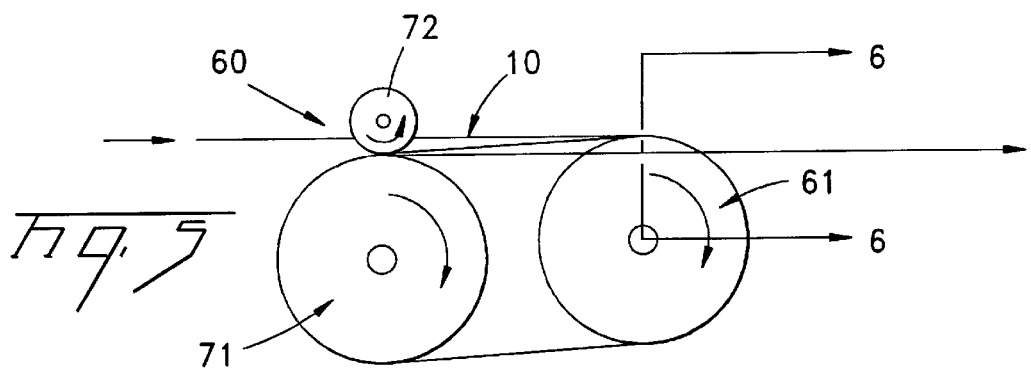
Fig. 5
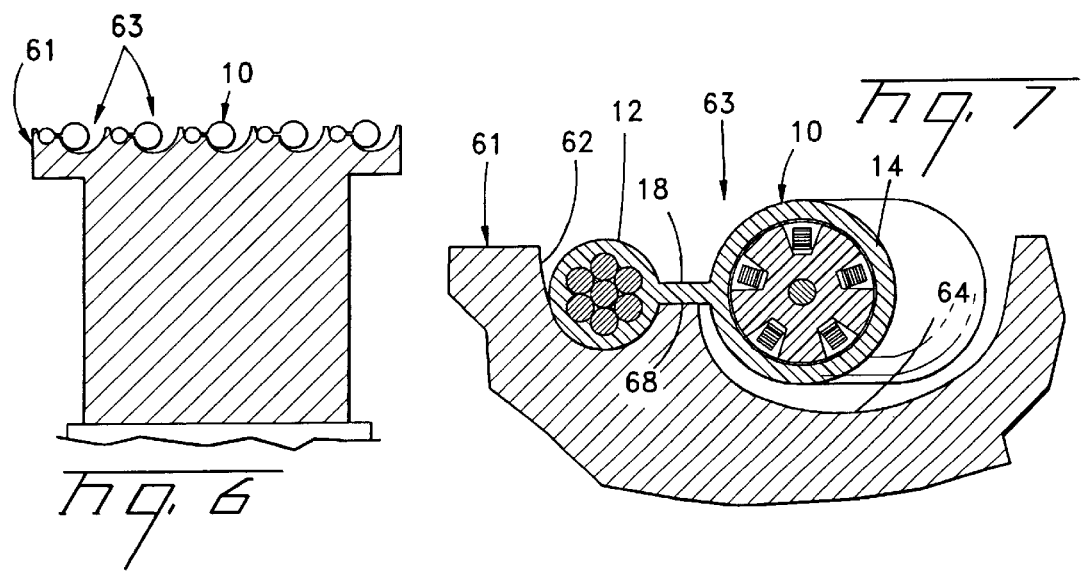
Fig. 6
Fig. 7

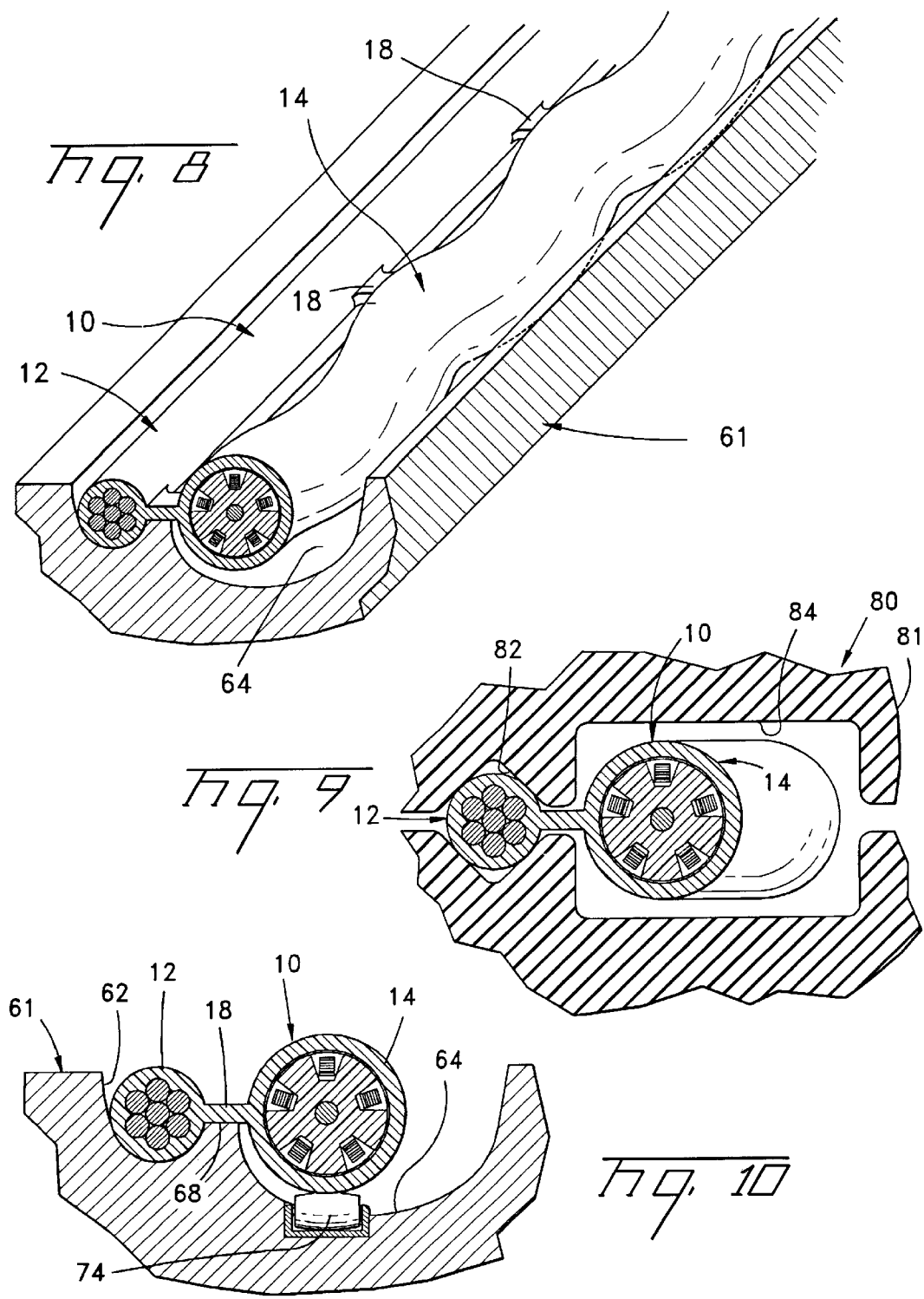

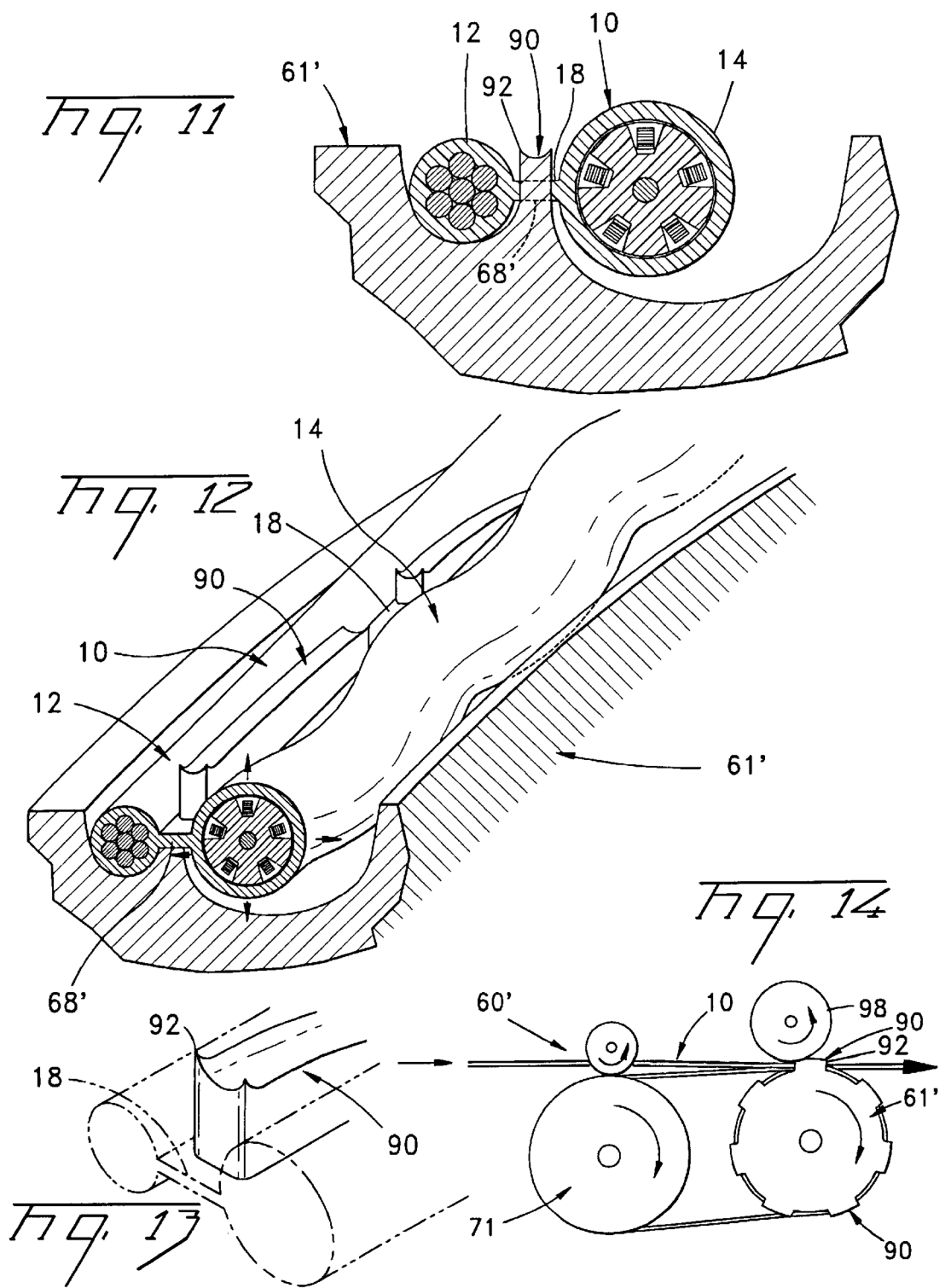

APPARATUSES AND METHODS FOR USE IN THE MAKING OF A SELF-SUPPORTING FIBER OPTIC CABLE

The present invention relates to apparatuses and methods for making self-supporting type fiber optic cables.

Fiber optic cables include optical fibers which transmit information in, for example, cable television, computer, and telephone systems. Self-supporting type fiber optic cables are designed for aerial self-supporting applications and typically include a messenger wire and a core section having conductors therein which may be optical fibers, or a combination of optical fibers and electrical wires. Self-supporting fiber optic cables of the "figure 8" type may be characterized into two general categories, namely, self-supporting cables with a core section having no excess length relative to the messenger wire, and self-supporting cables having a core section having an overlength, typically about 0.2%, relative to the messenger wire. Examples of known self-supporting cables having no core section overlength are disclosed in U.S. Pat. Nos. 4,449,012, 4,763,983, 5,095,176, and 5,371,823, the respective disclosures of which are incorporated by reference herein. Examples of known self-supporting cables having a core section overlength are disclosed in U.S. Pat. Nos. 4,662,712 and 4,883,671, the respective disclosures of which are incorporated by reference herein.

When installed in a self-supporting application, self-supporting cables may experience a high degree of tension. The messenger wire bears most of the tension, thereby supporting the core section, and protecting the optical fibers in the core section from high tensile forces. As tension acts on the messenger wire, however, the messenger wire tends to elongate which results in an elongation of the core section. Elongation of the core section of a self-supporting fiber optic cable not having a core section overlength may cause attenuation losses in the optical fibers in the core section. On the other hand, where the core section of a self-supporting cable having a core section overlength is elongated, the elongation is, up to the amount of existing overlength of the core section, advantageously taken up by the overlength in the core section whereby the core section may be elongated without potentially causing attenuation in the optical fibers.

Several methods of manufacturing self-supporting fiber optic cables having a core section overlength have been developed, for example, a sag formation method and a thermal/tensioning method. In the sag formation method, for example, as is disclosed in JP-8-136778 and JP-8-211260, the core section is given an excess length in the form of sagged portions and then the messenger and the core section are bound together at spaced intervals by a wire. As an alternative to wire, plastic clamps may be extruded about the messenger and the core section, for example, as is disclosed in JP-61-29811, U.S. Pat. Nos. 4,883,671, and 4,662,712. In lieu of a wire or clamps, a jacket may be simultaneously extruded about the messenger wire and the core section thereby forming a web between the messenger wire and the core section, for example, as is disclosed in JP-9-43467. In the event a jacket is extruded about the messenger and the core section, the extruder may include a plunger for forming windows in the web, as is disclosed in JP-46-38748 and JP-8-75969.

An example of the thermal/tensioning method is disclosed in JP-9-54232. The core section overlength is created by a heater disposed between a capstan and a brake. The heater heats the messenger wire and causes it to thermally elongate while the capstan and the brake simultaneously apply tension to the messenger wire to mechanically elongate the wire. The elongation created in the messenger wire is therefore the sum of the incremental elongations made by the thermal and mechanical elongations of the messenger wire.

Several disadvantages inhere in the use of the thermal tensioning method. First, heating the messenger wire is expensive and limits the production speed of the manufacturing line. Cooling of the messenger wire occurs at a relay drum around which the messenger wire is wrapped prior to extrusion of a jacket, and cooling of the messenger wire also occurs in a cooling trough. As the messenger wire cools its length shrinks thereby creating excess core length which may result in undesirable adhesion of the core to the messenger. Moreover, the capstan frictionally engages both the messenger wire and the core section which may result in a damaging amount of tension being applied across the webs that connect the messenger wire and the core section. Furthermore, the cable fits in the capstan in a way that does not allow for a range of core section diameters to be used with the capstan.

An additional disadvantage is that there is a lack of clearance space between the core section and the capstan. As the self-supporting cable progresses through the capstan, the tension in the cable is released thereby causing the core section to undulate. Since the cable receiving profile in the capstan is sized so that the jacketed messenger wire and core section are both coupled to the capstan, no clearance space exists for the formation of the undulations in the core section. The undulations therefore are defined by a warping of the core section exteriorly of the capstan. The lack of clearance space causes friction between the cable and the capstan that may result in deformation of the cable, and/or tearing of the webs, and the final product may not, therefore, meet customer specifications.

OBJECTS OF THE INVENTION

In view of the foregoing, it is an object of the present invention to provide a method of making a fiber optic cable having a messenger wire and a core, the method including the steps of: drawing the messenger wire and the core through a cable manufacturing line; extruding a jacket about the messenger wire and core thereby defining a cable with a messenger section and a core section; passing the cable across a tensioning apparatus having a clearance section receiving the core section; relieving tension in the cable as the cable progresses through the tensioning apparatus; and forming undulations in the core section as the cable progresses through the tensioning apparatus by maintaining an essentially decoupled relationship between the core section of the cable and the clearance section of the tensioning apparatus. The method may include a step wherein the tensioning apparatus cuts windows between the messenger section and the core section.

It is another object of the present invention to provide a method of making a fiber optic cable having a messenger wire and a core, the method including the steps of: applying tension to the cable and drawing the messenger wire and the core through a cable manufacturing line; passing the fiber optic cable across a tensioning apparatus; and dissipating the tension in the messenger wire only during progression of the cable through the tensioning apparatus.

It is a further object of the present invention to provide a cable tensioning apparatus for making a self-supporting fiber optic cable having a messenger section and a core section, the apparatus including: a messenger tensioner having a profile with a tensioning recess and a clearance recess; the tensioning recess being operative to grip and to apply tension to the messenger section; and the clearance recess being operative to essentially frictionlessly accommodate the formation of undulations in the core section. The tensioning apparatus may include at least one knife for forming windows in the cable.

It is another object of the present invention to provide an apparatus for manufacturing a fiber optic cable, the apparatus including: a cable core tensioning apparatus; a messenger wire tensioning apparatus; and a cable tensioning apparatus, the cable tensioning apparatus including a messenger tensioner having a profile with a tensioning recess and a clearance recess, the tensioning recess being operative to apply tension to a messenger section of the cable, and the clearance recess being operative to essentially frictionlessly accommodate the formation of undulations in the core section.

It is an object of the present invention to provide a cable tensioning apparatus for making a self-supporting fiber optic cable having a messenger section and a core section, comprising: a messenger tensioner having a profile with a tensioning recess and a clearance recess; the tensioning recess being operative to apply tension to the messenger section; the clearance recess being operative to essentially frictionlessly accommodate the formation of undulations in the core section whereby the undulations are free to be formed in any radial direction relative to the center of the core section.

BRIEF DESCRIPTION OF THE DRAWING FIGURES

FIG. 1 is a cross sectional view of an exemplary fiber optic cable according to the present invention.

FIG. 2 is an isometric view of the fiber optic cable of FIG. 1.

FIG. 4 is a top view of a tensioning apparatus according to the present invention.

FIG. 5 is a side schematic view of the tensioning apparatus of FIG. 4.

FIG. 6 is a partial cross sectional view of a portion of the tensioning apparatus of FIGS. 4–5 taken along line 6—6 of FIG. 5.

FIG. 7 is an enlarged partial cross sectional view of the tensioning apparatus of FIG. 6.

FIG. 8 is an isometric view of an self-supporting cable disposed in the tensioning apparatus of FIG. 4.

FIG. 9 is a partial cross sectional view of an alternative tensioning apparatus according to the present invention.

FIG. 10 is a partial cross sectional view of an alternative embodiment of the tensioning apparatus of FIG. 4.

FIG. 11 is an enlarged partial cross sectional view of an alternative tensioning apparatus according to the present invention including a knife for cutting part of the cable.

FIG. 12 is an isometric view of a self-supporting cable disposed in the alternative tensioning apparatus of FIG. 11.

FIG. 13 is an enlarged isometric view of the alternative tensioning apparatus of FIG. 11.

FIG. 14 is a side schematic view of the alternative embodiment tensioning apparatus of FIG. 11.

DETAILED DESCRIPTION OF THE INVENTION

Figure 3:
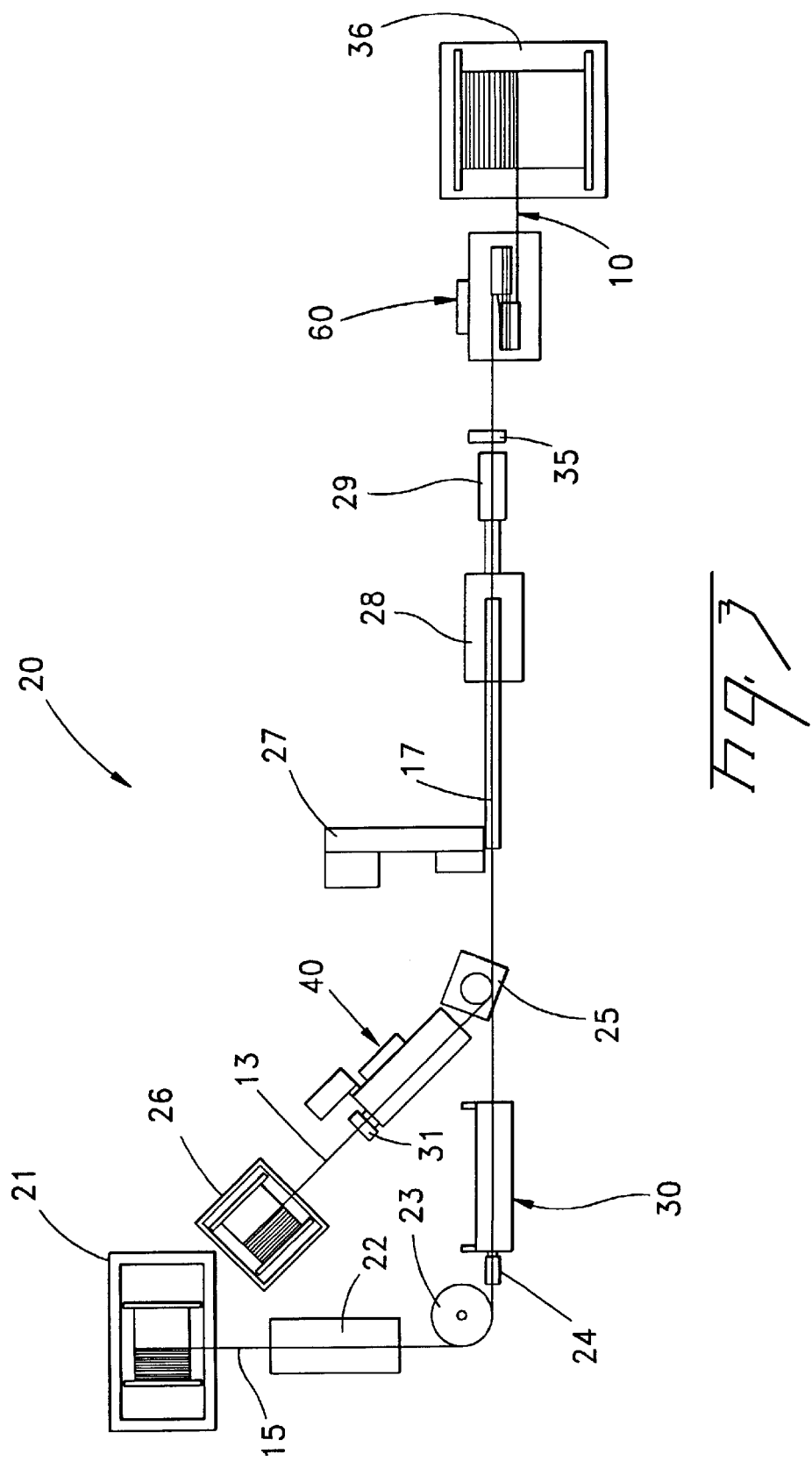
FIG. 3 is a schematic view of a cable manufacturing process according to the present invention.

Referring to FIGS. 1–2, an exemplary self-supporting cable 10 that can be made by the apparatus and method of the present invention will be described. Self-supporting cable 10 includes a messenger section 12 having steel wires 13, and a cable core section 14 having a cable core 15 of the slotted rod type having optical fiber ribbons 16 and a water absorbent tape 19 wrapped around cable core 15. An extruded jacket 17 envelopes messenger and cable core sections 12, 14, and a web 18 of the jacket connects the messenger and cable core sections together. Cable core section 14 has an excess length of about 0.2% relative to messenger section 12 whereby cable core section 14 has at least one undulation between webs 18 (FIG. 2).

The present invention is directed to a method and apparatus for making a self-supporting cable, for example, self-supporting cable 10. The method and apparatus of the present invention can be embodied in an exemplary manufacturing line 20 (FIG. 3). Manufacturing line 20 can include a core pay-off 21, a dancer 22, a turning sheave 23, a length counter 24, a turning sheave 25, a messenger wire pay-off 26, an extruder 27, a cooling trough 28, a cable dryer 29, a length counter 31, a diameter gage 35, and a cable take-up 36. In accordance with an aspect of the present invention, manufacturing line 20 includes a cable core tensioning apparatus 30, a messenger wire tensioning apparatus 40, and a cable tensioning apparatus 60.

Cable tensioning apparatus 60 preferably includes two messenger tensioners 61, 71 (FIG. 4) in the form of multi-wrap capstans (FIG. 5) driven by motors (not shown). To provide clearance for cable 10 to pass to take-up 36, the plane of rotation of messenger tensioner 71 is angularly offset from that of messenger tensioner 61 to the extent of about one cable width, and the center of rotation of messenger tensioner 71 is offset from the center of messenger tensioner 61 (FIG. 5). Messenger tensioner 61 preferably includes a series of receiving stations 63 for receiving self-supporting cable 10 therein (FIG. 6). Cable tensioning apparatus 60 may include a guide sheave 72 removably mounted adjacent messenger tensioner 71 (FIG. 5). Each receiving station 63 includes a profile having a tensioning recess 62, a clearance recess 64, and a medial portion 68 (FIG. 7). Tensioning recess 62 may be in the form of a radiussed surface, or a V-shaped groove, sized to grip jacket 17 around messenger section 12. Clearance recess 64 preferably has an arcuate shape, for example, an ellipsoid shape.

Manufacturing line 20 performs a method of making a self-supporting cable 10 comprising the steps of: drawing messenger wire 13 and core 15 through cable manufacturing line 20; extruding jacket 17 about messenger wire 13 and core 15 thereby defining a cable 10; passing cable 10 across a tensioning apparatus 60 having clearance section 64 receiving core section 14 of the cable; relieving tension in the cable as the cable progresses through tensioning apparatus 60; and forming undulations in core section 14 as the cable progresses through tensioning apparatus 60 by maintaining a decoupled relationship between core section 14 and clearance section 64 of tensioning apparatus 60.

More particularly, cable core 15 is fed from pay-off 21 to a conventional dancer 22, around turning sheave 23, into length counter 24, into cable core tensioning apparatus 30, and to turning sheave 25. Cable core tensioning apparatus 30 is preferably a single wrap tensioning capstan. Messenger wires 13 are fed from messenger wire pay-off 26 to messenger wire tensioning apparatus 40 and turning sheave 25 where messenger wire 13 is turned toward extruder 27. Messenger wire tensioning apparatus 40 is preferably a multi-wrap tensioning capstan that is run at about a 0.2% slower speed than core tensioning apparatus 30 for assuring sufficient elongation to core section 14. At this point, messenger wire 13 and cable core 15 are fed into extruder 27 wherein, for example, a polyethylene material defining jacket 17 is extruded onto messenger wire 13 and cable core 15 and a conventional plunger (not shown) is used to form windows between webs 18. Next, jacket 17 is cooled in cooling trough 28 and the outer diameter of jacket 17 is measured in diameter gauge 35. The maintenance of tension in messenger section 12, as more fully described below, results in essentially no undulation of core 15 in cooling trough 28. The cable passes into cable tensioning apparatus 60 and is wrapped about messenger tensioners 61, 71. Self-supporting cable 10 is then collected by take-up reel 36. Tensioning apparatus 60 pulls messenger wire 13 and cable core 15 through the extrusion process by maintaining a high degree of tension on messenger wire 13. According to the present invention, there is essentially no relative difference in velocity between messenger wire 13 and cable core 15 in the crosshead of extruder 27. As appratus 40 is driven at a slower speed relative to appratus 60, tension is cretaed in messenger wire 13 between tensioning appratus 60 and messenger wire tensioning appratus 40. As is best shown in FIG. 7, tensioning recess 62 grips messenger section 12, but clearance section 64 is sufficiently decoupled from core section 14 whereby tensioning apparatus 60 does not directly apply tension to core section 14. Tensioning apparatus 60, in cooperation with messenger wire tensioning apparatus 40, preferably creates tension directly in messenger section 12 only. Some of the tension created in messenger section 12, i.e., about 8,000–14,000 N, then flows across webs 18 to core section 14, whereby core section 14 is tensioned to a substantially less degree compared to the tension in messenger section 12, i.e., the tension in core section 14 is about 100–300 N. To avoid tearing of webs 18, shear forces acting on webs 18 and core section 14 are kept to the minimum necessary to draw core section 14 through manufacturing line 20.

Additionally, the present invention may be practiced in the form of a tensioning apparatus 80 including messenger tensioners 81 comprising elastomeric or plastic endless conveyors (FIG. 9). Each endless conveyor includes a tensioning recess 82 and a clearance recess 84. The endless conveyors can be mounted to a conventional caterpuller type apparatus whereby the conveyors are driven for rectilinearly applying tension to messenger 12. Clearance recesses 84 permit the formation of undulations in cable section 14.

The present invention embodies several advantages. For example, clearance recesses 64, 84 advantageously avoid direct application of tension to core section 14, and facilitate the ease of tension on core section 14 as cable 10 progresses through tensioning apparatuses 60, 80. Moreover, clearance recesses 64, 84 allow for a range of core section diameters. Additionally, clearance recesses 64, 84 permit the essentially frictionless formation of undulations in core 15, thereby avoiding damage to webs 18 and undue deformation of the cable. The undulations may be formed in any radial direction relative to the center of core section 14. The formation of undulations occurs as cable 10 progresses from the entrance point of cable 10 in tensioning apparatus 60, i.e., where tension is highest in messenger section 12, toward the exit of tensioning apparatus 60, at which point tension in cable 10 is substantially dissipated. The release in tension across tensioning apparatuses 60, 80 advantageously results in an overlength of core section 14 relative to messenger section 12, for example, to a value of about 0.2%. There may, however, be some incidental contact between core section 14 and clearance section 64, 84 which does not cause substantial friction in core section 14. To reduce the effects of friction caused by such incidental contact, for example, clearance recess 64 may include one or more essentially frictionless journalled support spacers 74 (FIG. 10).

The present invention may be practiced in the form of a tensioning apparatus 60' having at least one knife 90 for forming windows between webs 18 (FIGS. 11–14). A series of knives can be formed adjacent medial portions 68' on a single wrap of a capstan 61' (FIG. 14). Knives 90 preferably include sharpened edges 92 for cutting the windows (FIGS. 11 and 13). Tensioning apparatus 60' may include a pressing wheel 98 aligned with knives 90 so that the portion of jacket 17 that is to be removed will be sandwiched between pressing wheel 98 and knife 90 whereby windows will be formed in cable 10.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. For example, clearance recesses according to the present invention may be any shape which results in sufficient space for the formation of undulations without undue friction in the cable as the tension is released. The apparatus and method of the present invention may be used in the making of self-supporting fiber optic cables of the "figure 8" type characterized into the two general categories mentioned hereinabove, i.e., self-supporting cables with a core section having no excess length relative to the messenger wire, and self-supporting cables having a core section having an overlength, typically about 0.2%, relative to the messenger wire.

Accordingly, what is claimed is:

1. A method of making a fiber optic cable having a messenger wire and a core, comprising the steps of:
    drawing the messenger wire and the core through a cable manufacturing line;
    extruding a jacket about the messenger wire and core thereby defining a cable with a messenger section and a core section;
    passing the cable across a tensioning apparatus having a clearance section receiving the core section;
    relieving tension in the cable as the cable progresses through the tensioning apparatus; and
    forming undulations in the core section as the cable progresses through the tensioning apparatus by maintaining an essentially decoupled relationship between the core section of the cable and the clearance section of the tensioning apparatus.

2. The method of claim 1, wherein the tensioning apparatus forms windows between the messenger section and the core section.

3. A method of making a fiber optic cable having a messenger wire and a core, comprising the steps of:
    applying tension to the cable and drawing the messenger wire and the core through a cable manufacturing line;
    passing the fiber optic cable across a tensioning apparatus; and
    dissipating the tension in the messenger wire only during progression of the cable through the tensioning apparatus.

4. The method of claim 1, wherein the tensioning apparatus forms windows between the messenger section and the core section.

5. A cable tensioning apparatus for use in making a self-supporting fiber optic cable having a messenger section and a core section, comprising:

a messenger tensioner having a profile with a tensioning recess and a clearance recess;

the tensioning recess being operative to grip and to apply tension to the messenger section;

the clearance recess being operative to essentially frictionlessly accommodate the formation of undulations in the core section, whereby undulations are formed in the core section as the cable progresses through the tensioning apparatus by maintaining an essentially decoupled relationship between the core section of the cable and the clearance section of the tensioning apparatus.

6. The cable tensioning apparatus of claim 5, wherein the messenger tensioner comprises a capstan.

7. The cable tensioning apparatus of claim 5, wherein the messenger tensioner comprises an endless conveyor.

8. The cable tensioning apparatus of claim 5, wherein the clearance recess comprises a generally ellipsoidal shape.

9. The cable tensioning apparatus of claim 5, wherein the clearance recess comprises a generally rectangular shape.

10. The cable tensioning apparatus of claim 5, wherein the tensioning recess comprises an arcuate shape.

11. The cable tensioning apparatus of claim 5, wherein the tensioning recess comprises a generally V-shaped notch.

12. The cable tensioning apparatus of claim 5, wherein the tensioning apparatus includes at least one knife for forming windows in the cable.

13. An apparatus for use in manufacturing a fiber optic cable, comprising:

a cable core tensioning apparatus;

a messenger wire tensioning apparatus; and a cable tensioning apparatus, the cable tensioning apparatus including a messenger tensioner having a profile with a tensioning recess and a clearance recess, the tensioning recess being operative to apply tension to a messenger section of the cable, and the clearance recess being operative to essentially frictionlessly accommodate a formation of undulations in the core section, whereby undulations are formed in the core section as the cable progresses through the cable tensioning apparatus by maintaining an essentially decoupled relationship between the core section of the cable and the clearance recess of the cable tensioning apparatus.

14. The cable tensioning apparatus of claim 13, wherein the tensioning apparatus includes at least one knife for forming windows in the cable.

15. A cable tensioning apparatus for use in making a self-supporting fiber optic cable having a messenger section and a core section, comprising:

a messenger tensioner having a profile with a tensioning recess and a clearance recess;

the tensioning recess being operative to apply tension to the messenger section;

the clearance recess being operative to essentially frictionlessly accommodate the formation of undulations in the core section whereby the undulations are free to be formed in any radial direction relative to the center of the core section.

16. The cable tensioning apparatus of claim 15, wherein the tensioning apparatus includes at least one knife for forming windows in the cable.

* * * * *